United States Patent [19]

Krude

[11] 4,231,233
[45] Nov. 4, 1980

[54] RIGID NON-SLIDING HOMOKINETIC UNIVERSAL JOINT

[75] Inventor: Werner Krude, Neunkirchen, Fed. Rep. of Germany

[73] Assignee: Uni-Cardan Aktiengesellschaft, Lohmar, Fed. Rep. of Germany

[21] Appl. No.: 5,706

[22] Filed: Jan. 23, 1979

[30] Foreign Application Priority Data

Jan. 31, 1978 [DE] Fed. Rep. of Germany ........ 2804042

[51] Int. Cl.$^3$ ............................................. F16D 3/30
[52] U.S. Cl. ............................................. 64/21; 64/7
[58] Field of Search ................................. 64/21, 7, 8

[56] References Cited

U.S. PATENT DOCUMENTS

| | | | |
|---|---|---|---|
| 3,002,364 | 10/1961 | Bellomo | 64/21 |
| 3,475,924 | 11/1969 | Aucktor | 64/21 |
| 3,592,023 | 7/1971 | Okoshi | 64/21 |
| 3,965,701 | 6/1976 | Orain | 64/21 |
| 4,070,872 | 1/1978 | Krude | 64/21 |

FOREIGN PATENT DOCUMENTS 1960247  6/1970  Fed. Rep. of Germany ............. 64/21

*Primary Examiner*—Henry K. Artis
*Attorney, Agent, or Firm*—Toren, McGeady and Stanger

[57] ABSTRACT

In a rigid (non-sliding) homokinetic or constant velocity universal joint, an inner joint member is positioned within an outer joint member. The inner joint has a spherical outer surface which is guided by a spherical inner surface of the outer joint. Grooves in each of the joint members are arranged in pairs with a ball seated in and extending between the grooves in each pair for transmitting torque from one joint member to the other. Each groove is formed on a circular arc with a pair of grooves in the same joint member being formed on the same circular arc. The planes extending through the center line of two adjacent pairs of grooves in the same joint member intersect the axis of rotation of the joint members at a position spaced outwardly from the center of the joint.

5 Claims, 8 Drawing Figures

RIGID NON-SLIDING HOMOKINETIC UNIVERSAL JOINT

SUMMARY OF THE INVENTION

The present invention is directed to a rigid (non-sliding) homokinetic or constant velocity universal joint formed of an outer hollow joint member and an inner joint member positioned within the outer joint member. Both the inner surface of the outer joint member and the outer surface of the inner joint member contain grooves with the number of grooves in the outer joint member corresponding to that in the inner joint member. A ball is seated within a pair of grooves, one in the inner joint member and the other in the outer joint member for transmitting torque between the joint members. The center line of the grooves in each pair extend across one another and the balls are guided in a plane which bisects the angle between the axes of rotation of the inner and outer joint members.

In known joints of the above-described arrangement, note German Offenlegungsschrift 2,432,868 and German Offenlegungsschrift 1,960,247, it is possible to have an arrangement of the grooves and balls utilizing only four balls, since otherwise the space requirement of the joint would be significantly increased. An additional disadvantage of these known arrangements is that the torque capacity is significantly impaired, since only half of the balls located in the grooves take part in the transmission of torque. As a result, the space taken up by the joint is inadequately utilized for the actual torque capacity. Furthermore, it is disadvantageous that the balls located within the grooves are not held within a cage and require large angles of inclination between the center line of the grooves and the axis of rotation of the joint member containing the grooves. This known arrangement also has an increased space requirement. Further, large angles of inclination result in increased forces between the torque transmitting balls and the ball containing grooves, and such an arrangement leads to an increased heat generation as well as an inadequate efficiency.

Therefore, in view of the problems experienced in similar universal joints in the past, it is the primary object of the present invention to provide a universal joint design with ball grooves in both of the joint members and without a cage so that the same space requirement is involved and a better efficiency, a larger torque capacity, and a participation of all the balls in the torque transmitting action in both directions is attained.

In accordance with the invention, each groove extends along a circular arc and a plane through the arc intersects the axis of rotation of the joint member containing the groove at a distance spaced from the center of the joint.

A particularly advantageous feature of such a rigid joint is that the ball grooves can be produced in a time-saving and inexpensive manner. Furthermore, the torque in such a joint can be transmitted by all of the balls located within the joint.

Despite the fact that the joint can be produced in a simple manner, during use, bending angles of up to 45° can be achieved independently of the number of balls and even with a comparatively small space requirement for the joint, that is, where the outside diameter of the entire joint is small.

Moreover, the joint of the present invention is particularly advantageous, since only small forces occur between the balls and the grooves as a result of the relatively small angles of inclination of the ball grooves relative to the axes of rotation of the joint members.

Another particularly advantageous feature of the invention is that two ball grooves in the same joint member are formed along the same circular arc. In view of this feature, it is possible to form two ball grooves in a single step which affords a particular savings in cost. Moreover, where two circular arcs provide two pair of grooves in the same joint member, an adjustment in the formation of the grooves is required only once, then dividing errors have small opportunity to occur.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
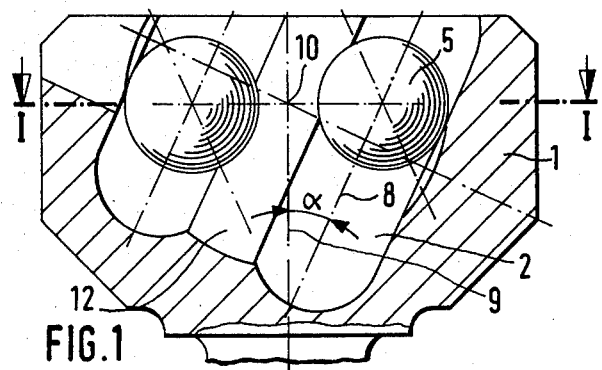
FIG. 1 is a sectional side view of the outer joint member in a rigid (non-sliding) homokinetic universal joint embodying the present invention.
Figure 2:
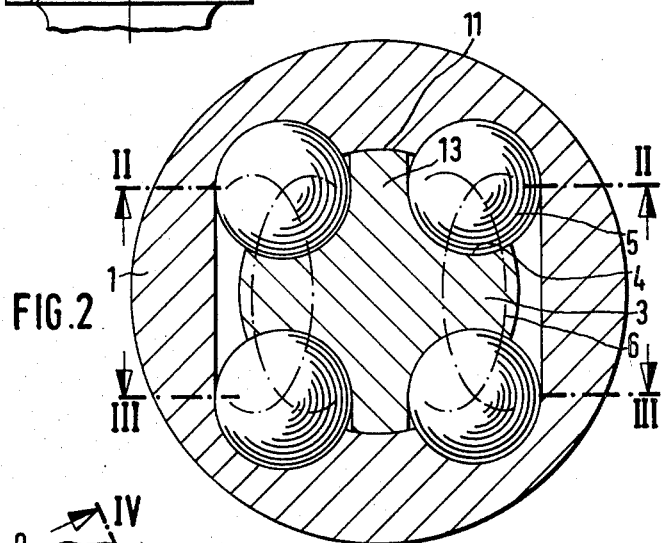
FIG. 2 is a sectional view of the rigid (non-sliding) homokinetic universal joint taken along the line I—I in FIG. 1.

The joint illustrated in FIGS. 1 and 2 consists of an outer joint member 1 containing grooves 2 in the surface defining its inner spherical hollow space, an inner joint member 3 located within the hollow space in the outer joint member with grooves 4 formed in the outer surface of the inner joint member. Balls 5 are positioned between a pair of oppositely arranged grooves 2, 4 and due to the arrangement of the grooves, the balls are held in a plane bisecting the angle between the axis of rotation of the parts of the universal joint. The center line of the grooves 4 in the inner joint member extend along a circular arc 6, however, it is possible that the center line could be formed of a circular arc and an additional straight line. The grooves 2 formed in the inner surface of the outer joint member extend in a mirror-inverted manner relative to the grooves 4 in the outer surface of the inner joint member 3. Torque transmission between the outer joint member 1 and the inner joint member 3 is effected through balls 5.

Figure 3:
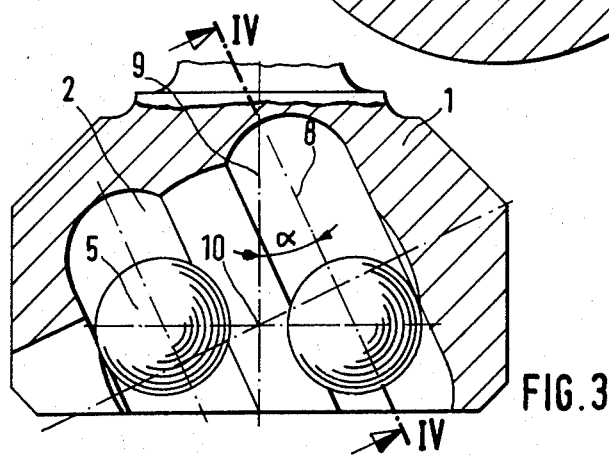
FIG. 3 is a cross-sectional side view taken along the line III—III in FIG. 2.
Figure 4:
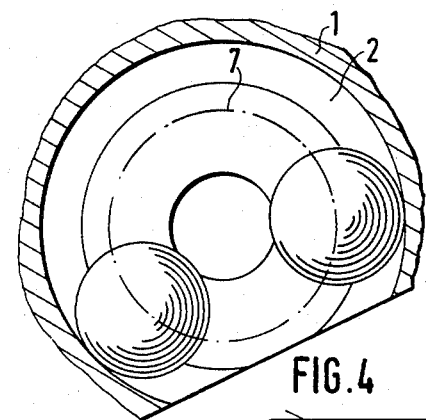
FIG. 4 is a sectional view taken along the line IV—IV in FIG. 3.
Figure 5:
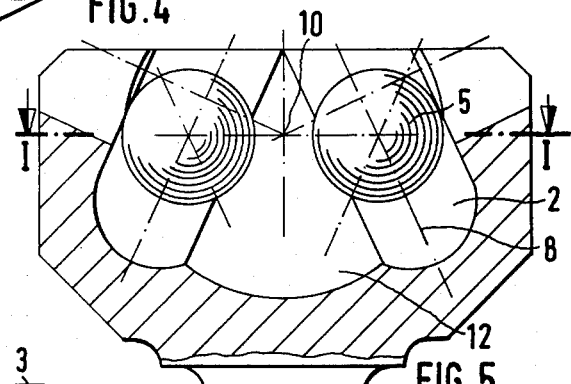
FIG. 5 is a sectional side view of the outer joint member of another rigid (non-sliding) homokinetic universal joint embodying the present invention.

FIG. 3 is a sectional view illustrating the opposite half of the outer joint member 1 to that shown in FIG. 1. The grooves 2 in the outer joint member contain corresponding balls 5 which provide the transmission of torque between the inner and outer joint members. The particular pattern of the grooves 2 is shown in the longitudinal section in FIG. 4. As is clearly shown in FIG. 4, a pair of grooves 2 on the opposite sides of the outer joint member are formed along the same circular arc 7 and a plane 8 contains the circular arc. The plane 8, as can be seen in FIGS. 1 and 3, is disposed at an angle $\alpha$ relative to the axis of rotation 9 of the outer joint member and the plane 8 containing the circular arc of the two grooves 2 intersects the axis of rotation 9 of the outer joint at a distance spaced from the center 10 of the joint. The center 10 is located on the axis of rotation of both of the joint members. Due to this arrangement of the grooves 2 it is possible to form the two corresponding opposite grooves in the outer joint member by means of a milling cutter in a single operation.

In the embodiment illustrated in FIGS. 1-4, the adjacent ball grooves 2 are arranged in parallel relation to one another and the grooves formed along the common circular arc are located in the same plane. The adjacent planes each containing a circular arc extending through two grooves 2 on opposite sides of the outer joint member are disposed in parallel. This parallel arrangement of the two pair of grooves is especially important in the formation of the grooves.

Due to the spherically shaped outer surface 11 of the inner joint member 3 which is guided in the spherically shaped surface defining the hollow space 12 of the outer joint member 1, axial movement between the two joint members is impossible. Because of the arrangement of the grooves 2, 4 in the outer joint member 1 and the inner joint member 2, respectively, webs 13 are formed in the inner joint member between adjacent grooves and the webs serve as guide surfaces in combination with the surface defining the hollow space 11 in the outer joint member 1.

Figure 6:
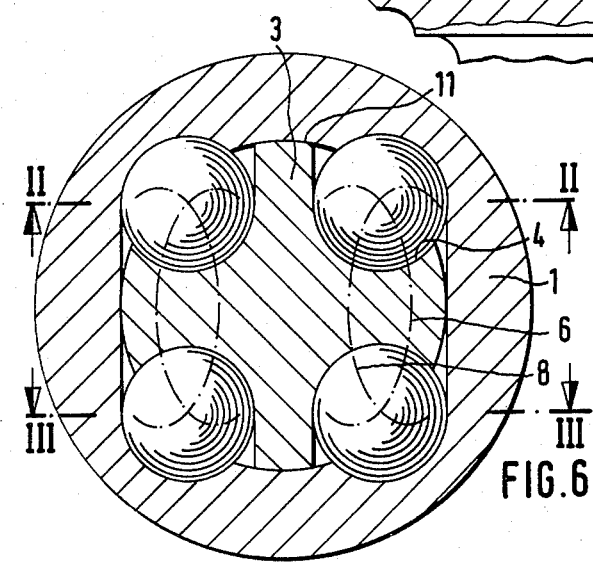
FIG. 6 is a sectional view taken along the line I—I in FIG. 5.
Figure 7:
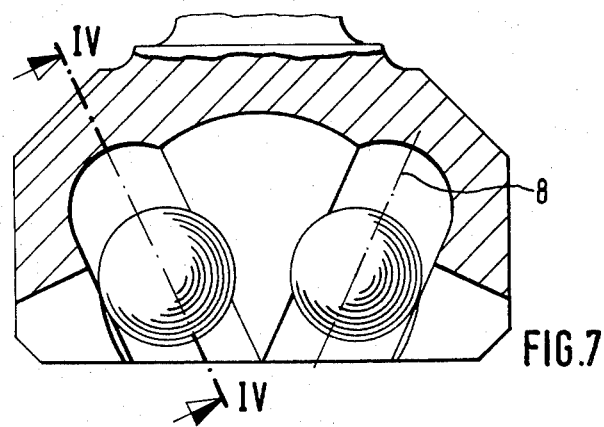
FIG. 7 is a sectional view taken along the line III—III in FIG. 6.
Figure 8:
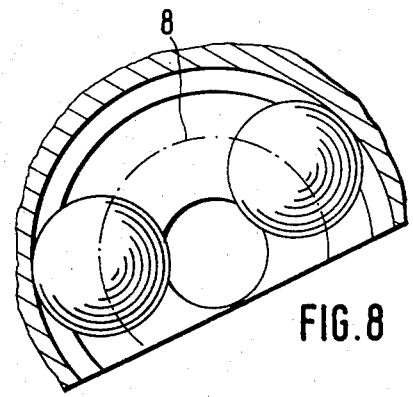
FIG. 8 is a sectional view taken along the line IV—IV in FIG. 7.

Another embodiment of the present invention is illustrated in FIGS. 5-8 and corresponds in principle to the embodiments shown in FIGS. 1-5. There is a difference in the arrangement of the grooves 2 in the outer joint member 1 in this second embodiment in that the two grooves extending along the same circular arc and located in the same plane are disposed so that the planes are angularly positioned relative to one another so as to intersect, as compared to the planes in the embodiment of FIGS. 1-4 which are in parallel relation. As is displayed in FIG. 8, the two balls 5 are located each in a groove extending along a common circular arc so that the two ball grooves can be produced by a milling cutter and a single operation. As shown in FIG. 6, this second embodiment is also constructed as a rigid joint, since the outer spherical surface 11 of the inner joint member 3 is guided within the spherical surface of the hollow space 12 of the outer joint member, relative axial movement between the two joint members 1, 3 is not possible. To guide the balls through half of the bending angle between the inner joint member 3 and the outer joint member 1, the grooves 2, 4 of the outer joint member 1 and the inner joint member 3, are arranged in a mirror-inverted manner as in the embodiment shown in FIGS. 1-4.

While specific embodiments of the invention have been shown and described in detail to illustrate the application of the inventive principles, it will be understood that the invention may be embodied otherwise without departing from such principles.

What is claimed is:

1. Rigid (non-sliding) homokinetic universal joint comprising an outer hollow joint member having an axes of rotation and having a spherical inner surface defining the hollow interior, said outer joint member having a plurality of grooves formed into said inner surface, an inner joint member having an axis of rotation angularly displaceable relative to the axis of rotation of said outer joint member and positioned within said outer hollow joint member and having a spherical outer surface, said inner joint member having a plurality of grooves formed into said outer surface and the number of said grooves corresponds to the number of said grooves formed into said outer joint member, said grooves in said outer joint member and said inner joint member are arranged in opposed pairs one in each of the joint members, a ball is seated in each opposed pairs of said grooves for transmitting torque therebetween, each of said grooves having a center line and the center lines of each opposed pair of grooves cross one another and form an angle therebetween, the centers of said balls guided in said opposed pairs of grooves being guided in a plane bisecting the angle between the axis of rotation of said inner and outer joint members, the spherical outer surface of said inner joint member is guided in the spherical inner surface of said outer joint member, the axis of rotation of said inner joint member and outer joint member intersecting at the center of the joint, wherein the improvement comprises that the center line of each of said grooves in said inner and outer joint members extends along a circular arc and a plane containing the circular arc intersects the axes of rotation of the joint member containing the groove at a location spaced from the center of the joint.

2. Rigid (non-sliding) homokinetic universal joint, as set forth in claim 1, wherein said grooves in said inner joint member are arranged in pairs and said grooves in said outer joint member are arranged in pairs with the grooves of each pair in the same joint member being located on the same circular arc and on opposite sides of the joint member and a plane through the same circular arc of each said pair of grooves in the same joint member intersects the axes of rotation of the same joint member at a distance spaced outwardly from the center of the joint.

3. Rigid (non-sliding) homokinetic universal joint, as set forth in claim 3, wherein the planes through the circular arcs of adjacent said pairs of grooves in the same joint member are disposed in parallel relation.

4. Rigid (non-sliding) homokinetic universal joint, as set forth in claim 2, wherein the planes through the circular arcs of adjacent said pairs of arcs in the same joint member are disposed obliquely angularly apart relative to one another.

5. Rigid (non-sliding) homokinetic universal joint, as set forth in claim 1, wherein said inner joint member has webs disposed between adjacent said grooves therein with said webs having spherically shaped outer surfaces forming a part of the outer surface of said joint member, and the spherically shaped surfaces of said webs serve as guide surfaces on the inner surface of said outer joint member.

* * * * *